DONALD G. WHITNEY
INVENTOR.

BY
Robert K. Rhea
AGENT

United States Patent Office 3,545,187
Patented Dec. 8, 1970

3,545,187
POWER LAWN RAKE
Donald G. Whitney, 1411 Rebecca Lane, Apt. 218, Norman, Okla. 73069
Filed Apr. 30, 1969, Ser. No. 820,501
Int. Cl. A01d 51/00, 77/02
U.S. Cl. 56—27      3 Claims

ABSTRACT OF THE DISCLOSURE

A motor supporting downwardly open mobile frame journals a reel driven by the motor. The reel includes a plurality of radial outwardly projecting tines. A control handle and debris receptacle is connected with the frame.

BACKGROUND OF THE INVENTION

Field of the invention

The present invention relates to lawn care and maintenance and more particularly to a reel type lawn rake or cleaner.

One of the problems of lawn maintenance is the raking of the lawn to remove leaves, twigs, and the like, which are on or become imbedded in the grass growth. Lawn sweeps or brushes generally used for this purpose are satisfactory for picking up cut grass and leaves lying on top of the trimmed grass but do not clean out leaves or other debris partially imbedded in the foliage.

Description of the prior art

In addition to the brush type lawn cleaning or sweeping devices presently used, the prior art discloses frame supported reels for lawn raking which usually includes a plurality of spring fingers or tines spaced about a shaft forming a reel. The effectiveness of these tines depends upon a number of factors, such as the degree or angle of engagement between the tines and grass including the spacing of the tines and their rotational velocity. In some devices the spring fingers are mounted in tapped holes in spaced-apart relation on the supporting shaft wherein these tines are connected in a fixed position such as disclosed by Pat. No. 2,826,034. This sometimes results in a crystallization and a failure of the tine adjacent its point of connection with the shaft. Other attempts to alleviate this problem have been to coil the tine in a helical manner to provide resilience such as disclosed by Pat. No. 3,125,844 or to use additional helical coiled springs to resiliently maintain the tine tangential with respect to its mounting shaft as disclosed by Pat. No. 1,939,385. This type of arrangement of the tines, in some instances, results in insufficient rigidity of the tines and, therefore, does effectively clean debris out of the grass foliage. In lawn cleaners or grass rakes of this type the length of the fingers must be necessarily limited in order to pass through the confines of the framework and so that they do not too deeply enter the soil of the lawn to avoid excessive uprooting of the grass.

It is, therefore, desirable to provide a reel, including a plurality of tines, which maintains sufficient rigidity throughout their useful life for picking up debris and depositing it in a trailing receptacle wherein the tines are each provided with inherent and mounted resilience for flexing when striking solid objects on the lawn, such as rocks, and so that the tines tend to clean themselves by a flipping or discharging action of the debris into the receptacle.

SUMMARY OF THE INVENTION

An open bottom wheel supported frame supports a driving motor and journals a reel between the wheels. Transmission means, between the motor and the reel, drives the device in a mobile manner. The reel comprises a central tube having a plurality of longitudinally extending radially and circumferentially spaced support rods secured thereto. A plurality of fingers or tines surround the rods in spaced relation and project radially outward of the tube. Resiliency is added to the tines by coils formed therein surrounding the respective supporting rod and its connection with the reel shaft. This permits the tines to engage the grass of a lawn and propel the device while substantially eliminating tendency toward crystallization or failure of any of the individual tines. Further, since the tines project into the grass mat of the lawn, they clean the latter of all debris contained thereby and do not tend to uproot any of the grass.

This type of lawn care equipment is easily adapted for the removable reception of a power unit or engine which is moved from one unit to another and connected with the frame thereof.

The principal object of this invention is to provide a mobile type lawn rake which will effectively clean a lawn without damage to the grass roots.

DESCRIPTION OF THE PREFERRED EMBODIMENT

Figure 1:
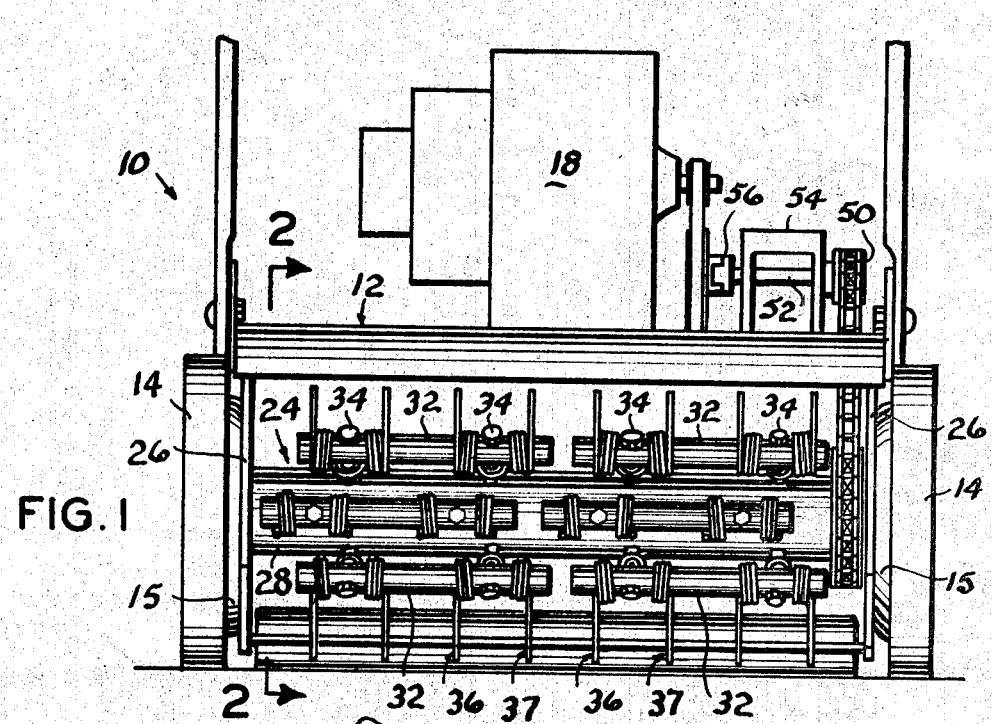
FIG. 1 is a fragmentary front elevational view of the device.

Like characters of reference designate like parts in those figures of the drawings in which they occur.

In the drawings:

The reference numeral 10 indicates the device, as a whole, having the general appearance of a conventional reel-type power mower comprising a generally horizontal frame 12 supported by wheels 14 and a supporting roller 16 and having an engine 18 mounted on the frame. The roller 16 is journalled by rearwardly and downwardly projecting brackets 17 mounted on wheel suporting housings 15. The wheels are interconnected by an axle 20 extending coaxially between the wheels 14. The axle is normally connected to the wheels 14 by cog wheels and dogs, neither of which are shown, and in this embodiment are removed so that the wheels and axle may rotate independently of each other. The axle 20 is normally connected with a plurality of grass cutting blades which are removed or omitted so that a rotary rake, indicated generally at 24, may surround the axle 20. Since the overall diameter of the rotary rake 24 is greater than the diameter of the grass cutting reel it replaces, the frame 12 is modified by elevating brackets 26 which connect the frame 12 to the wheel housings 15 so that the plane of the frame 12 is disposed above the upper limit of the wheels 14.

The rotary rake 24 includes a central tube 28 which coaxially surrounds the axle 20 and is secured thereto by spokes 30. A plurality of pairs, six in the example shown, of mounting tubes 32 are secured, in longitudinal parallel radially outward spaced relation, to the central tube 28 by bolts 34 extending diametrically through the respective end portions of the mounting tubes 32 and threadedly engaged with the wall of the central tube 28. A spacer or sleeve 35 is interposed between the mounting tubes 32 and central tube around each bolt 34. Each pair of the mounting tubes 32 are staggered longitudinally of the central tube 28 with respect to adjacent pairs of mounting tubes in order to stagger the position of pairs of tines 36–37 on one pair of mounting tubes with respect to the tines on adjacent pairs of mounting tubes.

Figure 3:
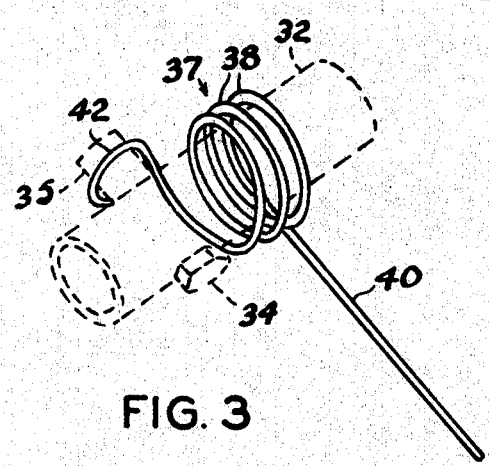
FIG. 3 is a perspective view of one of the rake tines illustrating, by dotted lines, its connection with its support.

The respective tines of the pairs 36–37 are mirror images of each other and as shown in FIG. 3, the tine 37 comprises a length of spring steel rod or wire having helical coils 38, intermediate its ends, loosely surrounding the mounting member 32 and having a straight spike portion 40, at one end, projecting radially outward of the central tube 28 and tangential with respect to its mounting tube 32 and on that side of the tube 32 toward the direction of rotation of the rake 24. The other end of the tine terminates in a generally circular hook-shaped loop 42 having its axis laterally off-set parallel with respect to the spike portion 40 and perpendicular with respect to the axis of the mounting tube 32. The loop 42 is interposed between the tube 32 and central tube 28 and surrounds the spacer 35 around the bolt 34. Thus, the respective tine 36 or 37 is not rigidly connected at any one point to the mounting tube 32 or spacer 35 thus permitting a limited amount of movement and permitting flexing of the spike portion 40 and a resultant tightening of the helical coil portion 38 around the mounting tube 32 during the raking action as hereinafter explained.

The rotary rake 24 has fixed therearound, at one end portion, a sprocket 46 which receives a chain 48 entrained around a driving sprocket 50 mounted on a shaft 52 supported by a bracket 54 mounted on the frame and driven by the engine 18 through a clutch 56. A grass catcher or debris receptacle 58 is connected to the roller supporting brackets 17 in a conventional manner rearwardly of the direction of movement of the device 10.

OPERATION

Figure 2:
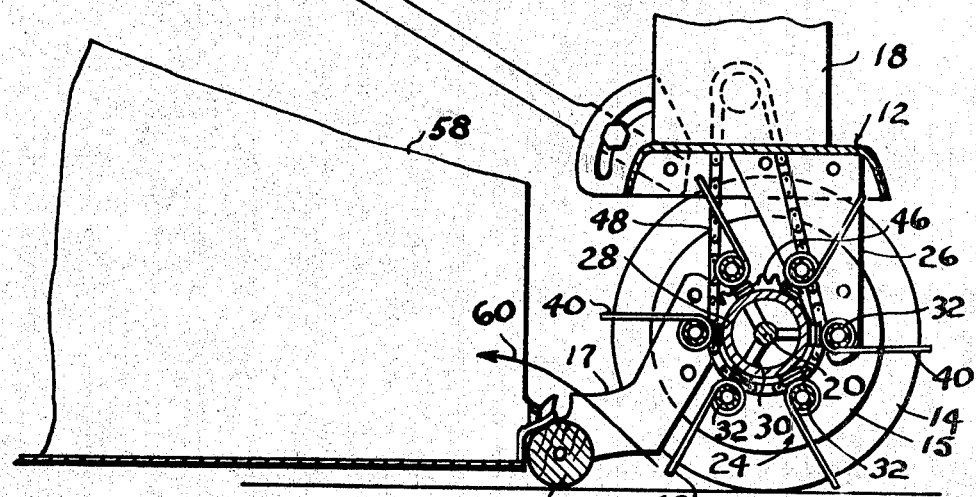
FIG. 2 is a fragmentary vertical cross-sectional view, partially in elevation, taken substantially along the line 2—2 of FIG. 1.

In operation the engine 18 is started and the clutch 56 engaged so that the chain 48 drives the rotary rake 24 in a clockwise direction, as viewed in FIG. 2. The spike portions 40 of the respective tines 36–37 engage the grass or turf and forms a means for propelling the device in a forward motion while simultaneously the tines engage and pick up leaves, twigs or other debris littering a lawn and propel them rearwardly and upwardly in the direction of the arrow 60 for deposit, by gravity, in the receptacle 58. Since the helical coil portion 38, of the respective tines around the respective mounting tube 32, disposes the spike portions 40 on the leading side edge of the mounting tubes with respect to the direction of the rotation of the rotary rake, the tines, when engaging objects, tend to be wound around the respective mounting tube 32 in a tightening action of the helical coil portion 38 so that as the device is propelled forwardly beyond a vertical center line through the axle 20 and axis of the tine helical coil 38 the tine spike portion 40 will be released in a resilient springing or flipping action which enhances the deposit of debris in the receptacle and tends to clean the ties of leaves or other litter clinging to or picked up by the tines spike portion.

Obviously the invention is susceptible to changes or alterations without defeating its practicability, therefore, I do not wish to be confined to the preferred embodiment shown in the drawings and described herein.

I claim:

1. In a power lawn rake having a downwardly open wheel supported frame, said frame journalling a trailing roller maintaining an upper surface of said frame horizontal and an engine mounted on said frame, the improvement comprising:
 a rotary rake extending between and coaxially connected with said wheels;
 chain and sprocket means connecting said engine with said rake for driving the latter,
  said rotary rake comprising a central tube,
   a plurality of mounting tubes longitudinally secured to said central tube in radial and circumferentially spaced relation; and
 a plurality of radially outward projecting turf engaging tines supported by said mounting tubes in longitudinal spaced relation.

2. Structure as specified in claim 1 and further including pairs of spacers interposed in circumferential staggered relation between said central tube and said mounting tubes.

3. Structure as specified in claim 2 in which said tines are formed from resilient and flexible material each having a helical coiled intermediate portion loosely surrounding a peripheral portion of each said mounting tube and defining one straight end portion tangential with respect to its mounting tube,
 the other end portion of each said tine describing a circular loop loosely surrounding coaxially one said spacer.

References Cited

UNITED STATES PATENTS

| | | | |
|---|---|---|---|
| 1,939,385 | 12/1933 | Burr | 56—400.02 |
| 2,826,034 | 3/1958 | Feuerlein | 56—400.02 |
| 2,987,866 | 6/1961 | Ferris | 56—27 |
| 2,989,833 | 6/1961 | De Fino | 56—27 |
| 3,024,587 | 3/1962 | Warnke | 56—27 |
| 3,125,844 | 3/1964 | Beyer | 56—27 |
| 3,308,612 | 3/1967 | Oblinger | 56—27 |
| 3,478,500 | 11/1969 | Rhoads | 56—27 |

RUSSELL R. KINSEY, Primary Examiner

U.S. Cl. X.R.

56—400.02